United States Patent
Saitoh et al.

(10) Patent No.: US 11,249,323 B2
(45) Date of Patent: Feb. 15, 2022

(54) OPTICAL FILM, LAMINATION-TYPE OPTICAL FILM, AND AERIAL IMAGING DEVICE INCLUDING LAMINATION-TYPE OPTICAL FILM

(71) Applicant: FUJIFILM Corporation, Tokyo (JP)

(72) Inventors: Yukito Saitoh, Minamiashigara (JP); Daisuke Kashiwagi, Minamiashigara (JP); Hirofumi Toyama, Minamiashigara (JP); Naoyoshi Yamada, Minamiashigara (JP); Takashi Yonemoto, Minamiashigara (JP); Eiichiro Aminaka, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 152 days.

(21) Appl. No.: 16/654,959

(22) Filed: Oct. 16, 2019

(65) Prior Publication Data
US 2020/0050009 A1    Feb. 13, 2020

Related U.S. Application Data

(63) Continuation of application No. PCT/JP2018/015323, filed on Apr. 12, 2018.

(30) Foreign Application Priority Data

Apr. 17, 2017    (JP) .............................. JP2017-081334

(51) Int. Cl.
*G02B 30/56*    (2020.01)
*C09K 19/36*    (2006.01)
(Continued)

(52) U.S. Cl.
CPC .............. *G02B 30/56* (2020.01); *C09K 19/36* (2013.01); *G02B 5/3016* (2013.01);
(Continued)

(58) Field of Classification Search
CPC ........ G02B 30/56; G02B 5/3016; G02B 5/12; C09K 19/36; C09K 2019/0448; C09K 2323/00; C09K 2323/03
(Continued)

(56) References Cited

U.S. PATENT DOCUMENTS

2011/0285956 A1* 11/2011 Akao ................... G02B 5/1833
349/201

FOREIGN PATENT DOCUMENTS

| JP | 2005-331757 A | 12/2005 |
|----|---------------|---------|
| JP | 2006-293393 A | 10/2006 |

(Continued)

OTHER PUBLICATIONS

International Preliminary Report on Patentability arid English translation of the Written Opinion of the international Searching Authority for International Application No. PCT/JP201 8/015323. dated Oct. 31, 2019.
(Continued)

*Primary Examiner* — Ruiyun Zhang
(74) *Attorney, Agent, or Firm* — Birch, Stewart, Kolasch & Birch, LLP

(57) ABSTRACT

An optical film includes a cholesteric liquid crystal layer formed in a stripe-shaped pattern in which an optically anisotropic region having optical anisotropy and an optically isotropic region having optical isotropy are alternately disposed, a helical axis of a cholesteric liquid crystal in the optically anisotropic region is oriented in one axial direction tin a plane of the optical film, and the helical axis is oriented in a normal direction t of a boundary surface between the optically anisotropic region and the optically isotropic region.

12 Claims, 5 Drawing Sheets

(51) Int. Cl.
   *G02B 5/30* (2006.01)
   *C09K 19/04* (2006.01)
   *G02B 5/12* (2006.01)

(52) U.S. Cl.
   CPC .. *C09K 2019/0448* (2013.01); *C09K 2323/00* (2020.08); *C09K 2323/03* (2020.08); *G02B 5/12* (2013.01)

(58) Field of Classification Search
   USPC ............... 428/1.1, 1.3; 430/321; 359/485.01, 359/483.01, 489.01, 489.02; 349/201
   See application file for complete search history.

(56) References Cited

FOREIGN PATENT DOCUMENTS

| | | |
|---|---|---|
| JP | 2011-175297 A | 9/2011 |
| WO | WO 2013/179405 A1 | 12/2013 |

OTHER PUBLICATIONS

International Search Report for International Application No. PCT/JP2018/015323, dated Jul. 17, 2018, with English translation.

\* cited by examiner

OPTICAL FILM, LAMINATION-TYPE OPTICAL FILM, AND AERIAL IMAGING DEVICE INCLUDING LAMINATION-TYPE OPTICAL FILM

CROSS-REFERENCE TO RELATED APPLICATIONS

This application is a Continuation of PCT International Application No. PCT/JP2018/15323, filed on Apr. 12, 2018, which claims priority under 35 U.S.C. § 119(a) to Japanese Patent Application No. 2017-081334, filed on Apr. 17, 2017. Each of the above application(s) is hereby expressly incorporated by reference, in its entirety, into the present application.

BACKGROUND OF THE INVENTION

1. Field of the Invention

The present invention relates to an optical film and particularly to an optical film that reflects obliquely incident light. In addition, the present invention also relates to a lamination-type optical film and an aerial imaging device including this lamination-type optical film.

2. Description of the Related Art

In the related art, as a method for imaging an image or a video in the air, a method in which an observer wears exclusive glasses during observation, whereby an image appears as if floating in the air, a method in which a substance invisible to eyes such as mist (fog) is used as a screen, and the like have been used. However, such methods required special glasses, environments, or the like and were thus not capable of imaging images in the air in all places.

In recent years, a plate in which a panel having a number of band-like micro mirrors (metal light reflection plates) are arranged at pitches of several hundreds of microns perpendicular to an upper surface inside a transparent flat plate, the same panel is laminated thereon, and the micro mirrors of the upper panel and the micro mirrors of the lower panel are disposed so as to be orthogonal to each other, thereby causing light to converge in the air has been provided (for example, JP2011-175297A). The use of this plate enables an image displayed on a liquid crystal display to be transmitted through the plate and form an image in the air and enables aerial imaging to be used in a variety of situations, unlike in the related art, without any limitations on the environment.

SUMMARY OF THE INVENTION

In a case where it becomes possible to form a large image in the air by using the above-described plate, it becomes possible to use the plate in a variety of situations such as advertisement or an amusement facility. In the case of using the plate in association with other products or techniques, it also becomes possible to use the plate in a variety of applications such as office equipment or security panels. However, in the case of forming the plate using micro mirrors in a regular pattern of several hundreds of microns, a precise manufacturing technique becomes necessary. Therefore, it has not been easy to increase the size of the above-described plate or imaging device or produce the plate or imaging device in quantity.

The present invention has been made in consideration of the above-described circumstance, and an object of the present invention is to provide an optical film having the same function as a plate including a micro mirror in a transparent film, a lamination-type optical film, and an aerial imaging device including this lamination-type optical film.

An optical film of an embodiment of the present invention is an optical film comprising a cholesteric liquid crystal layer formed in a stripe-shaped pattern in which an optically anisotropic region having optical anisotropy and an optically isotropic region having optical isotropy are alternately disposed, in which a helical axis of a cholesteric liquid crystal in the optically anisotropic region is oriented in one axial direction in a plane of the optical film, and the helical axis is oriented in a normal direction of a boundary surface between the optically anisotropic region and the optically isotropic region.

In addition, the optical film preferably reflects at least some of incident light incident on one surface of the optical film on the boundary surface and emits the incident light from the other surface of the optical film.

In addition, the cholesteric liquid crystal layer is preferably formed using a liquid crystal material which is cholesterically oriented and then irradiated with an ultraviolet ray at a temperature equal to or higher than a phase transition temperature to an isotropic phase, thereby exhibiting optical isotropy.

A lamination-type optical film of an embodiment of the present invention is a lamination-type optical film comprising: two sheets of the optical film laminated together, in which the two sheets of the optical film are laminated so that the boundary surfaces are orthogonal to each other.

An aerial imaging device of an embodiment of the present invention is an aerial imaging device comprising: a light source; and the lamination-type optical film, in which the lamination-type optical film is, relative to the light source, located at a location at which the lamination-type optical film is capable of reflecting light from the light source on the boundary surface of the lamination-type optical film and forming an image in the air.

The optical film of the embodiment of the present invention is formed in a stripe-shaped pattern in which the optically anisotropic region and the optically isotropic region are alternately disposed, and the helical axis of the cholesteric liquid crystal are oriented in the normal direction of the boundary surface between the optically anisotropic region and the optically isotropic region. Therefore, it is possible to provide the same function as that of a micro mirror in which a boundary surface is provided in a transparent flat plate, it becomes easy to increase the size of the optical film, and it also becomes possible to produce the optical film in quantity.

DESCRIPTION OF THE PREFERRED EMBODIMENTS

Hereinafter, the present invention will be described in detail.

A configurational requirement mentioned below will be described on the basis of a typical embodiment of the present invention, but the present invention is not limited to such an embodiment.

In the present specification, a numerical range expressed using "to" indicates a numerical range including numerical values before and after "to" as the lower limit value and the upper limit value.

In addition, in the present specification, an angle (for example, an angle such as "90°") and a relationship thereof (for example, "orthogonal", "parallel", "normal direction", and the like) are regarded to include an error range permissible in the technical field of the present invention. For example, an angle indicates a range of the angle±less than 10° or the like, and the error from the angle is preferably 5° or less and more preferably 3° or less.

In the present specification, numerical values, numerical ranges, and qualitative expressions (for example, expressions such as "the same" and "equal to") of individual members such as a phase difference film and a liquid crystal layer are supposed to be interpreted to indicate numerical values, numerical ranges, and properties including an error that is generally permitted for liquid crystal display devices or members that are used for liquid crystal display devices.

Hereinafter, an embodiment of an optical film of an embodiment of the present invention will be described with reference to drawings. In each of the drawings, the scales of individual configurational elements are different from actual ones for the convenience of showing the configurational elements.

<Optical Film>

Figure 1:
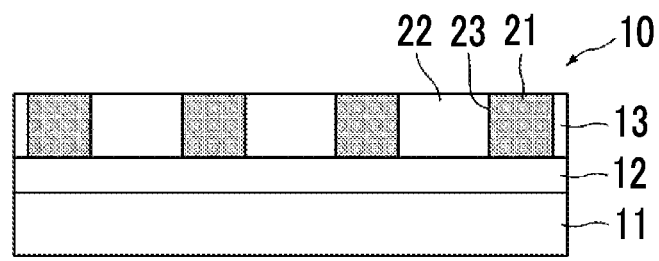
FIG. 1 is a schematic cross-sectional view showing an embodiment of an optical film of an embodiment of the present invention.

FIG. 1 shows a schematic cross-sectional view of an embodiment of the optical film of the embodiment of the present invention.

An optical film 10 of the present embodiment includes an orientation layer 12 and a cholesteric liquid crystal layer 13 on a support 11.

In the cholesteric liquid crystal layer 13, optically anisotropic regions 21 having optical anisotropy and optically isotropic regions 22 having optical isotropy are alternately disposed in a stripe shape in a plane.

The optically anisotropic regions 21 in the cholesteric liquid crystal layer 13 form a uniform lying helix (ULH) orientation in which helical axes of cholesteric liquid crystals are arranged in an in-plane direction. In addition, the helical axes are arranged along a normal direction of a boundary surface 23 between the optically anisotropic region 21 and the optically isotropic region 22.

The optically isotropic region refers to a region having a polarization state that does not substantially transform. Specifically, a front surface retardation Re is preferably 10 nm or less, and a thickness-direction retardation Rth is preferably 20 nm or less. In the present specification, the front surface retardation Re and the thickness-direction retardation Rth refer to values measured at a wavelength λ in AxoScanOPMF-1 (manufactured by Axometrics, Inc.). Unless particularly described, the wavelength λ is set to 550 nm.

Figure 2:
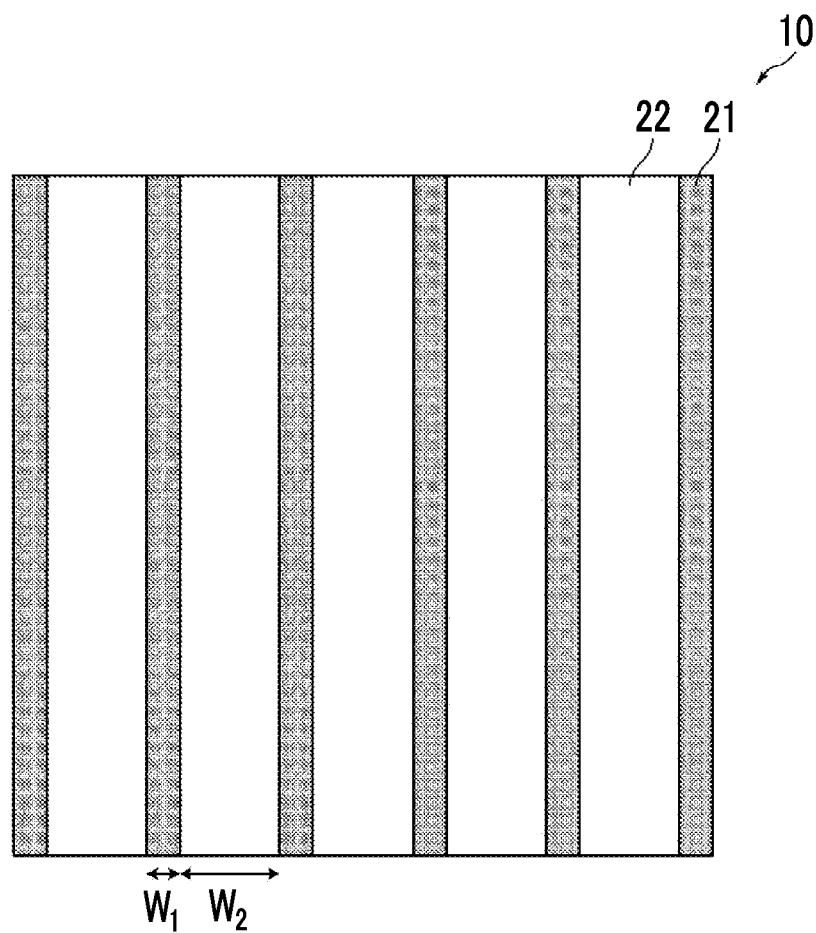
FIG. 2 is a top view showing the embodiment of the optical film of the embodiment of the present invention.

FIG. 2 shows a top view of the optical film. In FIG. 2, in order to differentiate the optically anisotropic region 21 and the optically isotropic region 22 in the cholesteric liquid crystal layer 13, the optically anisotropic region 21 is indicated by a grey color. As shown in FIG. 2, the cholesteric liquid crystal layer 13 is formed in a stripe-shaped pattern in which the optically anisotropic regions 21 (hereinafter, also simply referred to as the anisotropic regions) and the optically isotropic regions 22 (hereinafter, also simply referred to as the isotropic regions) are alternately disposed. A ratio $w_1:w_2$ in stripe width between a stripe width $w_1$ of the anisotropic region 21 and a stripe width $w_2$ of the isotropic region 22 is preferably 1:3 to 1:10. In addition, it is preferable that the stripe width $w_1$ is 3 μm to 15 μm, the stripe width $w_2$ is 9 μm to 45 μm, and the anisotropic regions and the isotropic regions are alternately disposed in the width direction with a period of 12 μm to 60 μm.

In FIG. 2, an example in which the stripe pattern is repeated with a certain period is shown, but the stripe width may be appropriately changed.

The film thickness of the cholesteric liquid crystal layer is preferably 2 to 30 μm, more preferably 2.5 to 20 μm, and still more preferably 3 to 15 μm.

In addition, whether a region is a region having optical isotropy or a region having optical anisotropy can be measured using a well-known method and can be measured using, for example, AxoScan manufactured by Axometrics, Inc.

<<Reflection Mechanism>>

Figure 3:
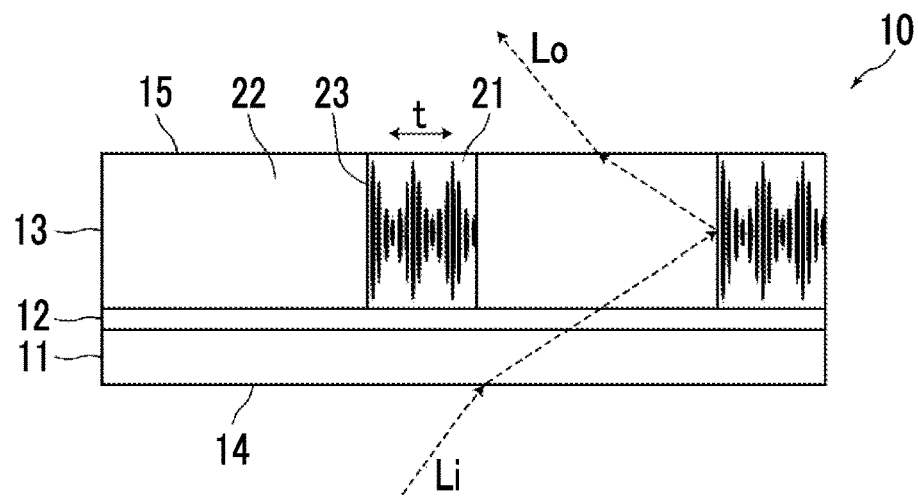
FIG. 3 is a view for describing incident light and reflected light with respect to the optical film of the embodiment of the present invention.

Next, a mechanism of emitting incident light incident on the optical film 10 will be described. FIG. 3 is a view for describing reflection in the optical film 10 of the embodiment of the present invention.

In the anisotropic region 21 of the cholesteric liquid crystal layer 13, helical axes of cholesteric liquid crystals are arranged in a normal direction t of the boundary surface 23 between the anisotropic region 21 and the isotropic region 22. Therefore, incident light Li that permeates through the support 11 and is incident on a side of a surface 14 of the isotropic region 22 (hereinafter, referred to as the incidence surface) is selectively reflected according to the helical pitches and the refractive index of the cholesteric liquid crystals on the boundary surface 23. Reflected light $L_o$ selectively reflected on the boundary surface 23 is emitted from a surface 15 opposite to the incidence surface 14 (hereinafter, referred to as the emitting surface).

The wavelength of the selectively reflected light becomes light shifted to a short wavelength side, and thus, in a case where it is necessary to obtain the reflected light $L_o$ having a predetermined wavelength, it is desirable to shift the helical pitches of the cholesteric liquid crystals to a wavelength longer than the predetermined wavelength. For example, for green incident light having a central wavelength of 550 nm, the helical pitch is desirably determined so that the reflection central wavelength of the boundary surface becomes approximately 50 to 200 nm longer.

Next, materials and manufacturing methods of the anisotropic region 21 and the isotropic region 22 of the optical film 10 will be described.

(Liquid Crystal Material)

The cholesteric liquid crystal layer 13 is preferably formed using a liquid crystal material which is cholesterically oriented and then irradiated with an ultraviolet ray at a temperature higher than or equal to a phase transition temperature to an isotropic phase, thereby exhibiting optical isotropy. As the liquid crystal material for forming the cholesteric liquid crystal layer 13, a composition including a polymerizable liquid crystal compound comprising a cation polymerizable group and a radical polymerizable group and a cationic polymerization initiator is preferred. Furthermore, the cholesteric liquid crystal layer may further contain other components such as an orientation control agent and an orientation aid. Particularly, it is possible to preferably use a polymerizable liquid crystal composition including a polymerizable liquid crystal compound described in JP2008-127336A.

—Polymerizable Liquid Crystal Compound—
—Rod-Shaped Liquid Crystal Compound—

First, a rod-shaped liquid crystal compound that is a material of the optical film which is obtained by fixing a cholesteric liquid crystalline phase will be described.

As the rod-shaped liquid crystal compound, it is possible to preferably use, for example, a rod-shaped liquid crystal compound described in JP1999-513019A (JP-H11-513019A) or JP2007-279688A, but the rod-shaped liquid crystal compound is not limited thereto.

Hereinafter, examples of the rod-shaped liquid crystal compound will be shown, but the present invention is not limited thereto.

Rod-shaped compound 18-1

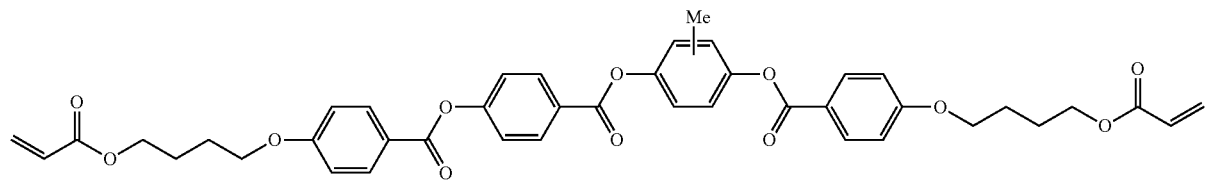

Rod-shaped compound 18-2

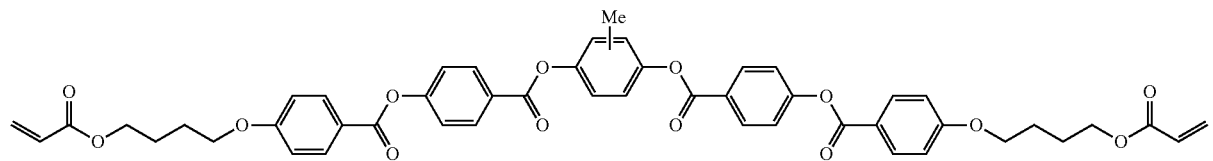

As the rod-shaped liquid crystal compound, a reverse wavelength dispersion rod-shaped liquid crystal compound is more preferably used. It is possible to use reverse wavelength dispersion rod-shaped liquid crystal compounds shown below, but the present invention is not limited thereto.

Polymerizable liquid crystal compound (A)

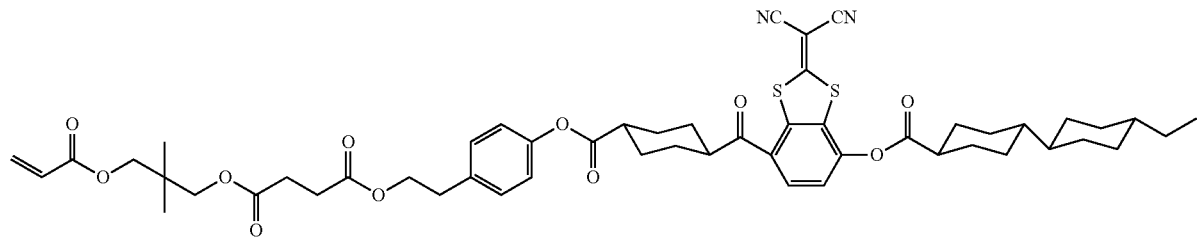

Polymerizable liquid crystal compound (B)

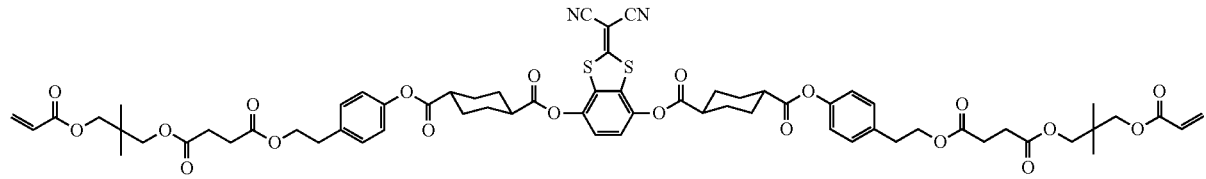

-continued

Polymerizable liquid crystal compound (C)

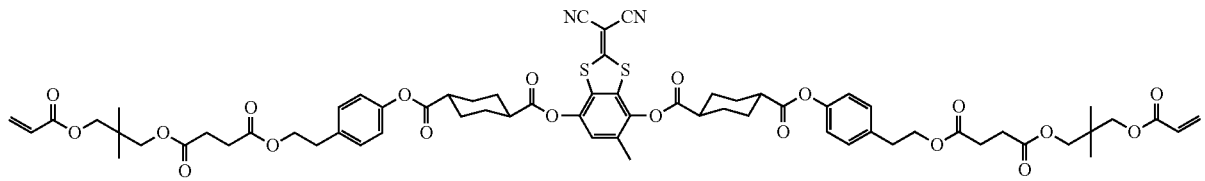

—Other Components—

The polymerizable composition that is used to form the optical film obtained by fixing the cholesteric liquid crystalline phase may contain, in addition to the rod-shaped liquid crystal compound, other components such as a chiral agent, an orientation control agent, a polymerization initiator, and an orientation aid.

The chiral agent can be selected from well-known chiral agents (for example, chiral agents for TN and STN described in page 199, Section 4-3, Chapter 3, Liquid Crystal Device Handbook, edited by of The 142$^{nd}$ Committee of Japan Society for the Promotion of Science (1989)). The chiral agent generally includes an asymmetric carbon atom, but an axial asymmetric compound or planar asymmetric compound including no asymmetric carbon atom can also be used as the chiral agent. Examples of the axial asymmetric compound or planar asymmetric compound include binaphthyl, helicene, paracyclophane, and derivatives thereof. The chiral agent may have a polymerizable group. In a case where the chiral agent has a polymerizable group and the rod-shaped liquid crystal compound that is jointly used with the chiral agent also has a polymerizable group, it is possible to form a polymer having a repeating unit derived from the rod-shaped liquid crystal compound and a repeating unit derived from the chiral agent due to a polymerization reaction between the chiral agent having a polymerizable group and the polymerizable rod-shaped liquid crystal compound. In this aspect, the polymerizable group that the chiral agent having a polymerizable group has is preferably the same kind of group as the polymerizable group that the polymerizable rod-shaped liquid crystal compound has. Therefore, the polymerizable group in the chiral agent is preferably an unsaturated polymerizable group, an epoxy group, or an aziridinyl group, more preferably an unsaturated polymerizable group, and particularly preferably an ethylenic unsaturated polymerizable group.

In addition, the chiral agent may be a liquid crystal compound.

As a chiral agent exhibiting a strong torsional force, for example, chiral agents described in JP2010-181852A, JP2003-287623A, JP2002-080851A, JP2002-080478A, and JP2002-302487A are exemplified and can be preferably used in the present invention. Furthermore, regarding isosorbide compounds described in the above-described unexamined publications, isosorbide compounds having a corresponding structure can also be used, and, regarding isomannide compounds described in the above-described unexamined publications, isomannide compounds having a corresponding structure can also be used.

(Orientation Control Agent)

As an example of the orientation control agent, it is possible to preferably use a hydrophilic type or the like of a fluoroalkyl group exemplified in JP2004-331812A.

As examples of other orientation control agents, a vertical orientation agent is exemplified. The blending of a vertical orientation agent enables the control of the vertical orientation of a liquid crystal compound. As an example of the vertical orientation agent, it is possible to preferably use a boronic acid compound and/or an onium salt described in JP2015-038598A.

ULH orientation refers to an orientation state in which the helical axes of the cholesteric liquid crystal layers become parallel to a film surface. That is, the ULH orientation is an orientation state in which the angle of a liquid crystal molecule with respect to the film surface continuously changes from horizontal to vertical. Therefore, it is preferable to impart a restraining force enabling the liquid crystal molecule to be in both a horizontal state and a vertical state. As an example, the above-described orientation control agent enables the control of the orientation restraining force of the liquid crystal molecule on a film surface side or on an air interface side and the formation of the above-described state. In addition, the orientation restraining force can also be controlled using an orientation layer described below.

Among polymerization initiators, examples of a photopolymerization initiator include α-carbonyl compounds (described in the respective specifications of U.S. Pat. Nos. 2,367,661B and 2,367,670B), acyloin ethers (described in the specification of U.S. Pat. No. 2,448,828B), α-hydrocarbon-substituted aromatic acyloin compounds (described in the specification of U.S. Pat. No. 2,722,512B), polynuclear quinone compounds (described in the respective specifications of U.S. Pat. Nos. 3,046,127B and 2,951,758B), combinations of a triarylimidazole dimer and a p-aminophenyl ketone (described in the specification of U.S. Pat. No. 3,549,367B), acridine and phenazine compounds (described in JP1985-040799A (JP-S63-040799A) and the specification of U.S. Pat. No. 4,239,850A), oxadiazole compounds (described in the specification of U.S. Pat. No. 4,212,970A), acylphosphine oxide compounds (described in JP1988-040799B (JP-S63-040799B), JP1993-029234A (JP-H05-029234A), JP1998-095788A (JP-H10-095788A), and JP1998-029997A (JP-H10-029997A)), and the like.

—Solvent—

As a solvent in the composition for realizing the optically anisotropic region and the optically isotropic region, an organic solvent is preferably used. Examples of the organic solvent include amides (for example, N,N-dimethylformamide), sulfoxides (for example, dimethyl sulfoxide), heterocyclic compounds (for example, pyridine), hydrocarbons (for example, benzene and hexane), alkyl halides (for example, chloroform and dichloromethane), esters (for example, methyl acetate and butyl acetate), ketones (for example, acetone, methyl ethyl ketone, and cyclohexanone), and others (for example, tetrahydrofuran and 1,2-dimethoxyethane). Alkyl halides and ketones are preferred. Two or more kinds of organic solvents may be jointly used.

<Production of Optical Film>

Figure 4:
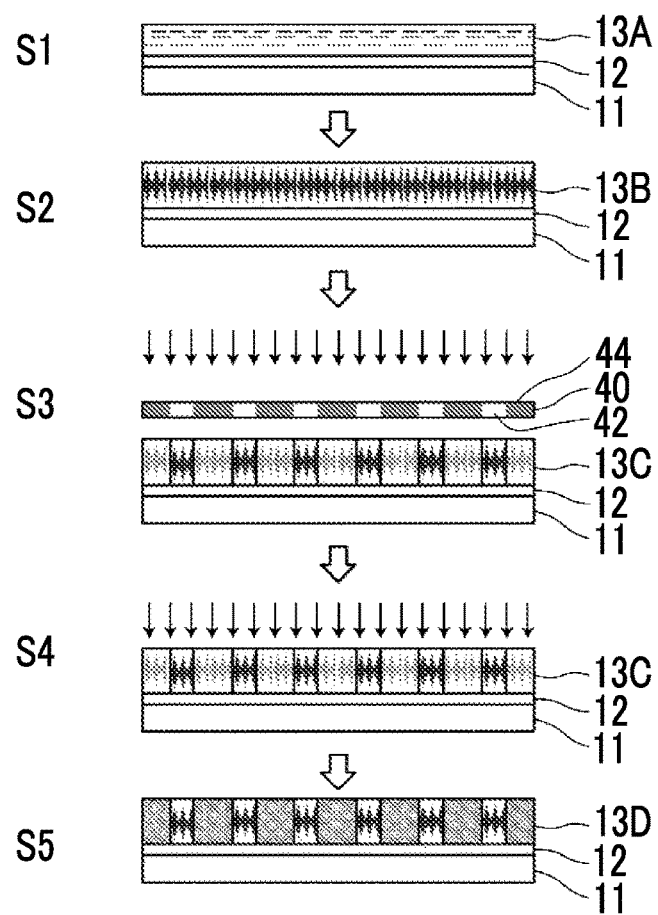
FIG. 4 is a view showing manufacturing steps in a method for manufacturing the optical film of the embodiment of the present invention.

A method for producing the optical film will be described with reference to manufacturing steps shown in FIG. 4.

<<Orientation Step>>

First, the orientation layer 12 is provided on the support 11. As an example, polyvinyl alcohol (PVA) or the like is applied onto the support and dried. Next, a rubbing treatment is carried out on a surface of the dried applied film in a predetermined direction, thereby forming an orientation layer. The rubbing treatment is carried out by rubbing the surface of the applied film with paper or fabric in a certain direction several times. Therefore, the applied film becomes anisotropic, and liquid crystal molecules are oriented in the certain direction during the application of a liquid crystal layer. In addition, the orientation layer 12 may be formed by carrying out not only the rubbing treatment but also a photo orientation treatment. At the time of carrying out the photo orientation treatment, it is possible to use a cinnamic acid derivative of the orientation layer or a well-known material such as an azo compound.

The ULH orientation by which the helical axes are arranged in a direction parallel to the surface of a film of the cholesteric liquid crystal layer can be realized by carrying out an orientation treatment such as rubbing or photo orientation (ultraviolet orientation) on the orientation layer 12. Generally, while an orientation treatment that causes the liquid crystal molecules to be oriented in a direction orthogonal to the helical axes is carried out, the orientation restraining force is adjusted not to be excessively strong so that the liquid crystal molecules are not completely horizontally oriented (planar orientation). In such a case, it is possible to form the ULH orientation in which the helical axes are arranged in the direction parallel to the surface of the film. In this case, generally, the helical axes become orthogonal or parallel to an orientation treatment direction in the plane. The orientation restraining force can be adjusted using the rubbing intensity, the irradiation energy of ultraviolet rays described below, and the like. In addition, on the air interface side as well, it is possible to form the ULH orientation in which the helical axes are arranged in the direction parallel to the surface of the film by adding the orientation control agent to a material of the applied film described below so that liquid crystals do not become uniformly horizontal or uniformly vertical with respect to the interface. In the ULH orientation, generally, the helical axes are arranged in an in-plane orthogonal direction with respect to the rubbing direction.

<<Application Step>>

The polymerizable liquid crystal composition is uniformly applied to a surface of the orientation layer 12 provided on the support 11 (or onto the support), thereby forming an applied film 13A (S1).

The polymerizable liquid crystal composition can be applied using a method or the like in which the polymerizable liquid crystal composition put into a solution state by being dissolved in a solvent or the polymerizable liquid crystal composition turned into a liquid-form substance such as a molten liquid by heating is applied using a method such as a roll coating method, a gravure printing method, or a spin coating method. Furthermore, the polymerizable liquid crystal composition can be applied using a variety of methods such as a wire bar coating method, an extrusion coating method, a direct gravure coating method, a reverse gravure coating method, and a die coating method. In addition, it is also possible to form the applied film by ejecting the liquid crystal composition from a nozzle using an ink jet device.

<<Aging Step>>

The applied film 13A is held at a film surface temperature for a certain period of time (aged), thereby forming an applied film 13B in a state in which the liquid crystals are oriented (S2). For example, the aging temperature is preferably set to 80° C. to 120° C., and the aging time is set in a range of eight minutes to 10 minutes. The aging temperature and the aging time may be determined, depending on the liquid crystal compound.

<<Ultraviolet Curing Step>>

After the aging step, it is possible to carry out ultraviolet curing in order to fix the orientation state of the molecules of the liquid crystal compound. In an ultraviolet curing step, a polymerization reaction by a photo-cationic polymerizable group (photo-cationic polymerization reaction) and a polymerization reaction by a photo-radical polymerizable group (photo-radical polymerization reaction) are separately progressed. The order of the curing step will be described.

1) Mask Exposure Step

In a state in which a mask 40 having a stripe pattern is disposed on the applied film 13B, ultraviolet rays are radiated to the applied film 13B through the mask 40 having a stripe pattern at room temperature in the atmosphere in an exposure amount of 30 to 1,000 mJ/cm$^2$ (S3). The mask 40 having a stripe pattern is a mask in which opening portions 42 corresponding to the anisotropic regions 21 and non-opening portions 44 corresponding to the isotropic regions 22 are formed in order to obtain the anisotropic region 21 and the isotropic region 22. Therefore, regions in the applied film 13B which are exposed through the mask opening portions 42 are exposed, photo-radical polymerization by an action of the photo-radical polymerization initiator progresses, and the anisotropic region 21 are formed. On the other hand, portions covered with the mask non-opening portions 44 are not exposed and thus become regions in which the orientation state is half fixed, and a patterned liquid crystal half-fixed film 13C is obtained.

During mask exposure, the mask 40 is disposed so that a long-side direction of the stripe pattern becomes parallel to a rubbing direction. As described above, the in-plane helical axes in the ULH orientation are orthogonal to the rubbing direction, and thus the helical axes are oriented in the normal direction of the boundary surface 23 between the anisotropic region 21 and the isotropic region 22 by setting the long-side direction of the stripe pattern of the mask 40 to be parallel to the rubbing direction.

In the present specification, "half fixation" refers to a state in which the liquid crystal composition loses fluidity and refers to a state before a heat treatment step. For example, a state of a polymer liquid crystal in which only a single-side functional group of a difunctional liquid crystal cross-links is referred to. In the case of a polymerizable liquid crystal compound including a photo-cationic polymerizable group and a photo-radical polymerizable group, a state in which one of the photo-cationic polymerizable group or the photo-radical polymerizable group is selectively cross-linked is referred to. In a full-surface exposure step, a state in which the photo-cationic polymerizable group is selectively cross-linked is referred to, but crosslinking by the photo-radical polymerizable group may be generated in some of the polymerizable liquid crystal compounds.

2) Heating and Exposure Step

Furthermore, the entire substrate is heated at an optically isotropic region-forming temperature (a temperature equal to or higher than the phase transition temperature to the optically isotropic region) of the liquid crystal compound under nitrogen for a predetermined time and exposed to ultraviolet rays in an exposure amount of 30 to 1,000 mJ/cm$^2$ (S4), whereby liquid crystals in regions not exposed through the mask form optically isotropic regions, and, in regions exposed through the mask, a cholesteric liquid crystal layer 13D in which the orientation state of the liquid crystals of the entire substrate is fixed while the orientation of the liquid crystals is maintained is formed (S5).

With the above-described steps, it is possible to obtain the cholesteric liquid crystal layer 13 in which the anisotropic regions 21 and the isotropic regions 22 are formed in a pattern shape.

In the above description, a case where the photo-cationic polymerizable groups of the polymerizable liquid crystal compound having the photo-cationic polymerizable group and the photo-radical polymerizable group are polymerized first and then the photo-radical polymerizable groups are polymerized has been described, but a pattern phase difference film having the same anisotropic regions and isotropic regions can also be formed by polymerizing the photo-radical polymerizable groups first and then polymerizing the photo-cationic polymerizable groups. In such a case, as the polymerizable liquid crystal composition, a polymerizable liquid crystal composition including a photo-radical polymerization initiator instead of the photo-cationic polymerization initiator may be used. In addition, a photo-radical polymerization initiator application step becomes unnecessary, and an application step of a photo-cationic polymerization initiator may be provided separately before cationic polymerization.

Next, elements other than the cholesteric liquid crystal layer which configure the optical film will be described.

[Support]

The optical film may include a support. As the support, a transparent support is preferred, and polyacrylic resin films such as polymethyl methacrylate, cellulose resin-based films such as cellulose triacetate, cycloolefin polymer-based films (for example, trade name "ARTON" (manufactured by JSR Corporation), trade name "ZEONOR' (manufactured by Nippon Zeon Corporation)), and the like can be exemplified. The support is not limited to a flexible film and may be a non-flexible substrate such as a glass substrate.

The optical film of the embodiment of the present invention may be an optical film that is used in a state of being supported by the support during the production of a film or may be an optical film that is supported by a temporary support as the support during the production of a film, transferred to another support, and then used after the peeling of the temporary support.

[Orientation Layer]

An orientation layer may be provided on the support for forming the liquid crystal layer. The orientation layer can be provided using means such as a rubbing treatment of an organic compound (preferably a polymer), the oblique evaporation of an inorganic compound, or the formation of a layer having a microgroove. Furthermore, an orientation layer having an orientation function generated by the application of an electric field, the application of a magnetic field, or irradiation with light is also known. The orientation layer is preferably formed by carrying out a rubbing treatment on a surface of a film of a polymer. In the case of using the optical film after the peeling of the support used during the production of a film, the orientation layer is preferably peeled off together with the support.

In the case of using a resin support, it is also possible to, depending on the kind of the polymer, directly carry out an orientation treatment (for example, a rubbing treatment) on the support without providing the orientation layer, thereby causing the support to function as the orientation layer. As an example of such a support, polyethylene terephthalate (PET) can be exemplified.

<Lamination-Type Optical Film>

Next, a second embodiment will be described. In the present embodiment, a lamination-type optical film obtained by laminating two sheets of the optical film of the first embodiment will be described. Optical films 10a and 10b are the same as the optical film 10 of the above-described embodiment and thus will not be described in detail.

Figure 5:
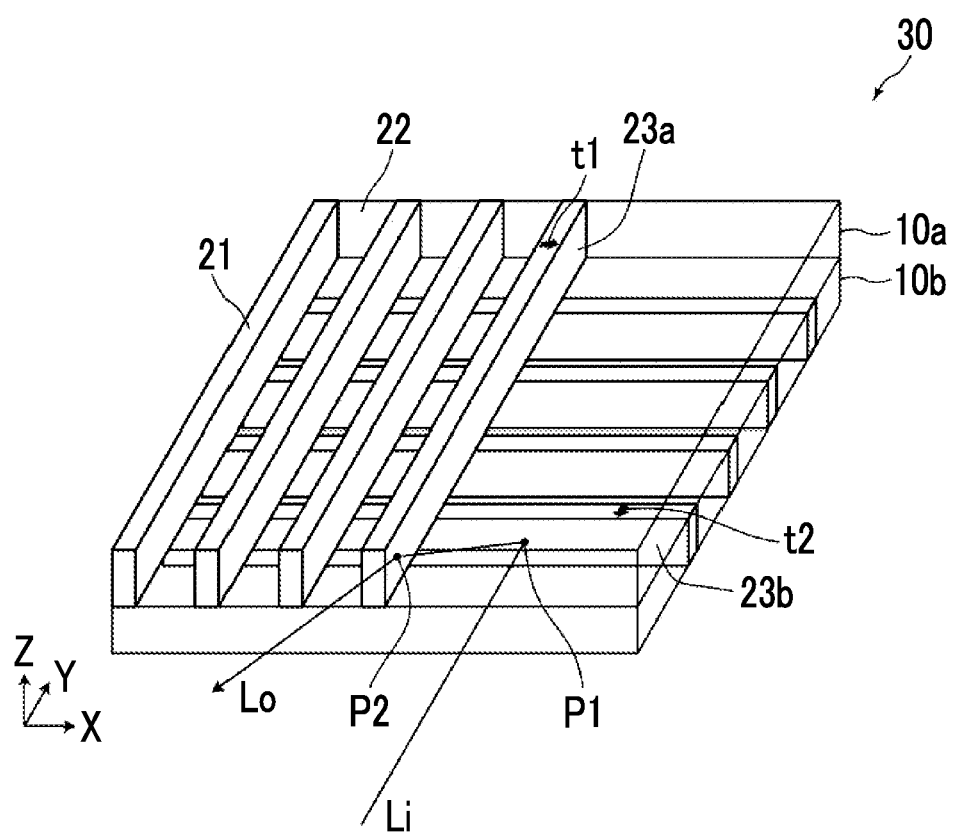
FIG. 5 is a perspective view showing an embodiment of a lamination-type optical film of an embodiment of the present invention.

As shown in FIG. 5, in a lamination-type optical film 30, two optical films 10a and 10b are laminated so that individual boundary surfaces 23a and 23b are orthogonal to each other. The direction of the helical axes of cholesteric liquid crystals in the optical film 10a as an upper layer becomes t1, and the direction of the helical axes of cholesteric liquid crystals in the optical film 10b as a under layer becomes t2. Incident light Li incident from below is reflected at a point P1 on the boundary surface 23b of the optical film 10b that is a first optical film, and reflected light Lo reflected at a point P2 on the boundary surface 23a of the optical film 10a that is a second optical film is emitted from the lamination-type optical film 30.

Figure 6A:
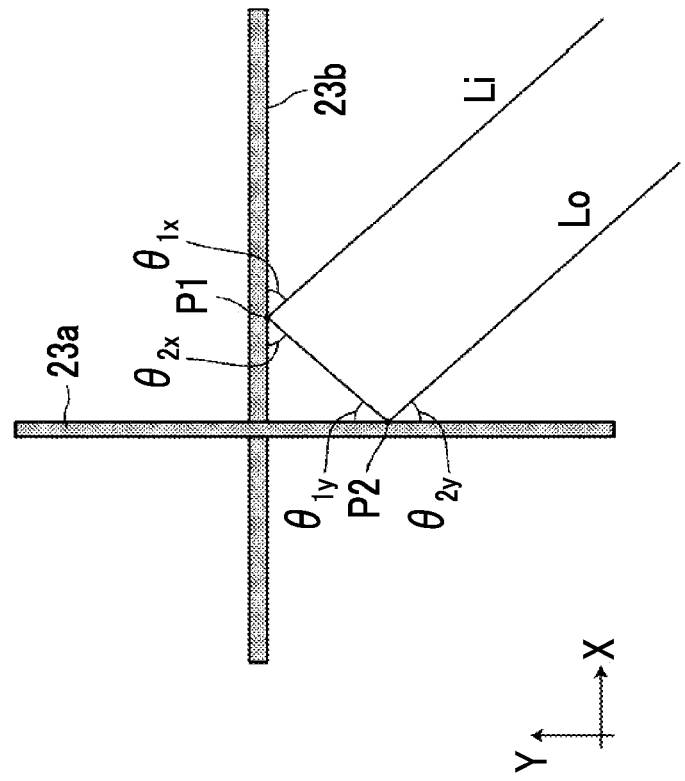
FIGS. 6A and 6B are views for describing incident light and reflected light with respect to the lamination-type optical film of the embodiment of the present invention.
Figure 6B:
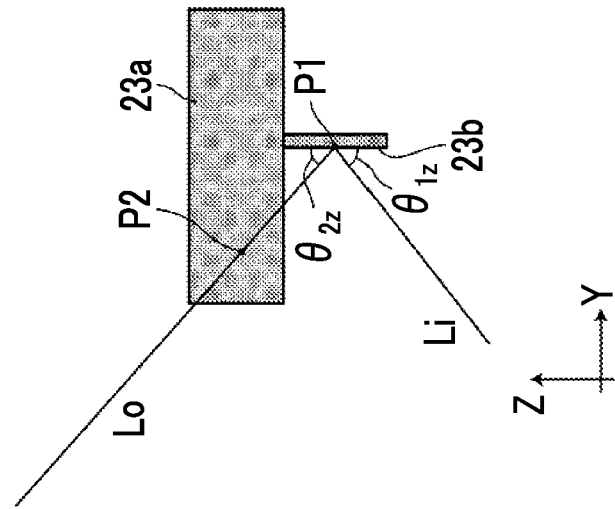

The mechanism of the emission of incident light incident on the lamination-type optical film 30 will be described using FIG. 6A, FIG. 6B, and FIG. 7. FIG. 6A shows incident light and reflected light seen from an upper surface (XY plane) of the lamination-type optical film 30, and FIG. 6B shows incident light and reflected light seen from a side surface (YZ plane) of the lamination-type optical film 30.

As shown in FIG. 6A, an incidence angle $\theta_{1x}$ and a reflection angle $\theta_{2x}$ become equal to each other at the point P1 on the boundary surface 23b of the optical film 10b that is the first optical film, and an incidence angle $\theta_{1y}$ and a reflection angle $\theta_{2y}$ of reflected light from the optical film 10b that is the first optical film become equal to each other at the point P2 on the boundary surface 23a of the optical film 10a that is the second optical film. Therefore, the incident light Li and the reflected light Lo are parallel to each other in the case of being seen from the XY plane. Meanwhile, in the case of being seen from the YZ plane, as shown in FIG. 6B, an incidence angle $\theta_{1z}$ and a reflection angle $\theta_{2z}$ become equal to each other at the point P1 on the boundary surface 23b of the optical film 10b that is the first optical film; however, in the optical film 10a that is the second optical film, the direction of the reflected light Lo at the point P2 on the boundary surface 23a and the direction of the reflected light Lo from the optical film 10b that is the first optical film are the same as each other. Therefore, as shown in FIG. 7, an incidence angle $\theta_i$ of the incident light Li incident on the lower surface of the lamination-type optical film 30 and a reflection angle $\theta_o$ of the reflected light Lo emitted from the upper surface of the lamination-type optical film 30 become equal to each other.

<Aerial Imaging Device>

Next, a third embodiment will be described. In the present embodiment, an aerial imaging device 50 in which the lamination-type optical film 30 of the second embodiment is used will be described. FIG. 7 shows a schematic cross-sectional view of the aerial imaging device 50 including the lamination-type optical film 30.

Figure 7:
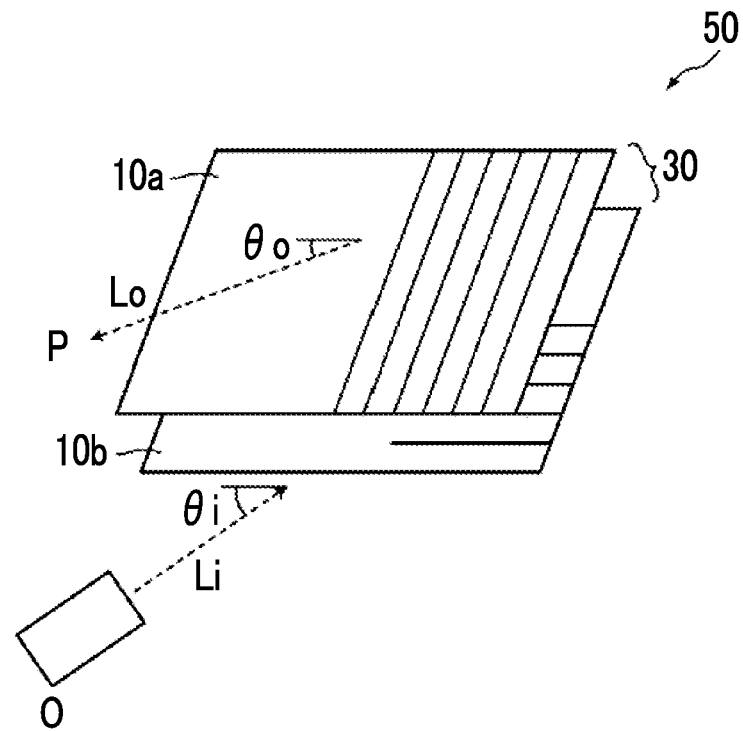
FIG. 7 is a schematic cross-sectional view of an aerial imaging device of an embodiment of the present invention.

As shown in FIG. 7, the aerial imaging device 50 includes a light source O and the lamination-type optical film 30.

Figure 8:
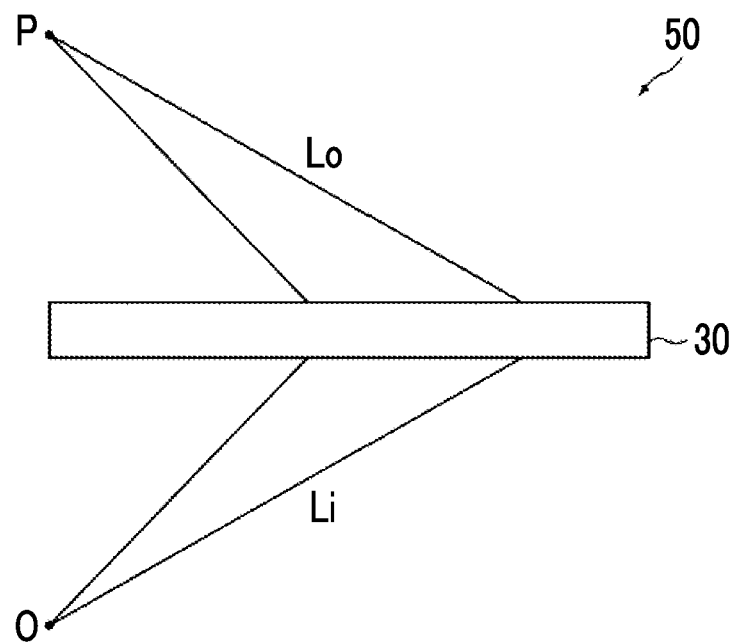
FIG. 8 is a view for describing a light source location and an imaging location of the aerial imaging device of the embodiment of the present invention.

As shown in FIG. 8, among light rays emitted from the light source O, the incident light Li incident on an incidence surface side of the lamination-type optical film 30 at a predetermined incidence angle $\theta_1$ is emitted as the reflected light $L_o$ at a reflection angle $\theta_2$ which is the same angle as the incidence angle $\theta_1$ from an emission surface opposite to the incidence surface of the lamination-type optical film 30 (refer to FIG. 7), and thus the reflected light Lo forms an image at an imaging location P. The location of the light source O and the imaging location P become locations that are plane-symmetric with respect to the lamination-type optical film 30.

On the boundary surfaces 23a and 23b of the optical films 10a and 10b that configure the lamination-type optical film 30, among incident light components, circularly polarized light components in the same rotation direction as the helices of the cholesteric liquid crystals are reflected by the cholesteric liquid crystals. Therefore, it is desirable to turn light emitted from the light source O into circularly polarized light in the same rotation direction as the helices of the cholesteric liquid crystals. In such a case, it is possible to increase the brightness of an image at an imaging location by increasing the utilization ratio of the light quantity.

In addition, it is desirable that each of the optical films 10a and 10b configuring the lamination-type optical film 30 includes a first cholesteric liquid crystal layer, a second cholesteric liquid crystal layer, and a third cholesteric liquid crystal layer and the boundary surfaces 23a and 23b of the respective cholesteric liquid crystal layers selectively reflect light in different wavelength ranges. For example, it is preferable that the boundary surfaces 23a and 23b of any one of the three cholesteric liquid crystal layers are blue reflection surfaces having a peak of a reflection rate that is 380 to 499 nm in reflection central wavelength and 100 nm or less in half-width, the boundary surfaces 23a and 23b of any one cholesteric liquid crystal layer are green reflection surfaces having a peak of a reflection rate that is 500 to 599 nm in reflection central wavelength and 200 nm or less in half-width, and the boundary surfaces 23a and 23b of any one cholesteric liquid crystal layer are red reflection surfaces having a peak of a reflection rate that is 600 to 750 nm in reflection central wavelength and 150 nm or less in half-width, and it is desirable to match the helical pitches to wavelengths shifted toward the long wavelength side by approximately 50 to 200 nm from the respective reflection central wavelengths.

In a case where the lamination-type optical film is configured to reflect light in the wavelength ranges of three colors as described above, the aerial imaging device 50 becomes capable of forming color images.

EXAMPLES

Hereinafter, characteristics of the present invention will be more specifically described using examples and comparative examples. Materials, amounts used, proportions, processing contents, processing orders, and the like described in the following examples can be appropriately modified within the scope of the gist of the present invention. Therefore, the scope of the present invention is not supposed to be interpreted in a limited manner by specific examples described below.

(Preparation of Orientation Layer Composition A)

A composition described below was stirred and dissolved in a container having a temperature maintained at 80° C., thereby preparing an orientation layer composition A.

Orientation Layer Composition a (Parts by Mass)

| Pure water | 96 |
| PVA-205 (manufactured by Kuraray Co., Ltd.) | 4 |

(Preparation of Cholesteric Composition LC-1)

A composition described below was prepared, then, filtered using a polypropylene filter having a pore diameter of 0.2 µm, and used as a cholesteric composition LC-1.

Cholesteric Composition LC-1 (Parts by Mass)

| Polymerizable liquid crystal compound: Compound (A) | 100 |
| Chiral agent having the following structure | 5.4 |
| Polymerization initiator: Irg-907 (manufactured by BASF) | 3.0 |
| Levelling agent: Fluorine-based polymer (E) | 0.3 |
| Solvent: Chloroform | 380 |

Compound (A)

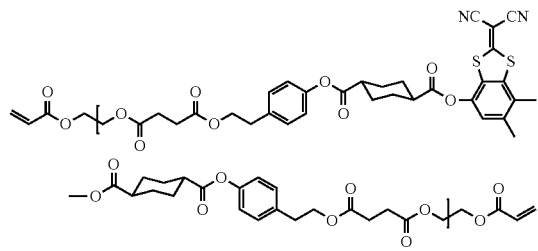

Chiral agent

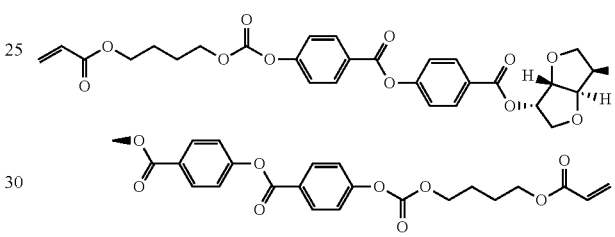

Flourine-based polymer (E)

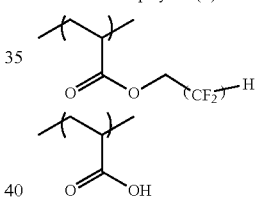

Example 1

An optical film of Example 1 was produced in the following order.

<Patterning>

The orientation layer composition A was applied onto a glass substrate using a #6 bar and then dried in an oven at 100° C. for 10 minutes, and then a rubbing treatment was carried out in a direction parallel to an application direction of an orientation layer (orientation step). The cholesteric composition LC-1 was applied onto the rubbing-treated surface (application step). Next, the cholesteric composition was heated and dried on a hot plate at 160° C. for 60 seconds and then cooled to 100° C. (aging step). Next, the cholesteric composition was irradiated with ultraviolet rays through a stripe-pattern mask having 3 µm mask opening portions (line portions) and 9 µm mask non-opening portions (space portions) in an exposure amount of 500 mJ/cm$^2$ (365 nm-based) using a PLA-501F stepper manufactured by Canon Inc. (ultrahigh-pressure mercury lamp) (mask exposure step). Here, the stripe pattern was formed in a direction parallel to a rubbing direction.

The line portions are regions irradiated with ultraviolet rays, and the space portions are regions for which ultraviolet rays were blocked. The distance between the mask and the glass substrate (proximity gap) was set to 50 µm. After that, the entire substrate was exposed under nitrogen in an air-cooling metal halide lamp (manufactured by Eye Graphics Co., Ltd.) in an exposure amount of 1,000 mJ/cm$^2$ while being heated in a 200° C. atmosphere for five minutes, thereby obtaining a cholesteric pattern divided into an anisotropic region having cholesteric reflection with a reflection central wavelength of 630 nm and a stripe width of 3 µm and an isotropic region having a stripe width of 9 µm (heating and exposure step).

In addition, the thickness of the film after the production of the pattern was measured using a reflection spectroscopic film thickness meter FE-3000 (manufactured by Otsuka Electronics Co., Ltd.) and found out to be 4 µm.

(Evaluation Standards)

The measured reflectivity of the optical film was evaluated according to the following standards. "A", "B", and "C" are in a range with no practical problems, "A" and "B" are preferred, and "A" is more preferred.

A: 50% or more
B: 30% or more and less than 50%
C: more than 20% and less than 30%
D: 20% or less The results are shown in Table 1. It is found that, in both Examples 1 and 2, the reflected light could be sufficient detected at the plane-symmetric place. This fact shows that Examples 1 and 2 function as an optical imaging device. In Table 1, $w_1$ indicates the stripe width of the anisotropic region and $w_2$ indicates the stripe width of the isotropic region.

TABLE 1

|  |  |  | Example 1 | Example 2 | Comparative Example 1 |
|---|---|---|---|---|---|
| Configuration | Cholesteric liquid crystal layer | Pattern | Present | Present | None |
|  |  | Ratio of stripe width $w_1/(w_1 + w_2)$ | 0.25 | 0.25 | — |
|  |  | Stripe width $w_1$ of anisotropic region | 3 µm | 3 µm | — |
|  |  | Number of sheets laminated | 1 | 2 | 1 |
| Effect |  | Reflectivity | A | A | D |

Example 2

A lamination-type optical film was manufactured by laminating two sheets of the optical film produced in Example 1 so that the stipe directions of the two sheets were orthogonal to each other.

Comparative Example 1

An optical film was produced without carrying out the mask exposure step in Example 1.

[Evaluation]

A green LED NSPG346KS manufactured by Nichia Corporation was used as a light source, and light that travels straight was produced using a collimating lens. This light was transmitted through a polarization plate and a circularly polarizing plate to turn the light into right-circularly polarized light, the right-circularly polarized light was radiated in a direction of 45° with respect to the normal direction of the optical film ($\theta_i$ in FIG. 7), light reflected in a direction of −45° on a plane symmetric side of the optical film ($\theta_o$ in FIG. 7), which was necessary for the light to form an image, was detected at a place that was plane-symmetric to the light source using a photodiode manufactured by Thorlabs Japan Inc. as a detector and regarded as reflected light. An optical system was produced with reference to a document: Proc. of SPIE Vol. 9940, 99401A. In addition, the peak wavelength of LED at this time was 522 nm.

The present measurement was carried out in a case where the number of the optical films was one as Example 1 and in the case of a lamination-type optical film in which two sheets of the optical film of Example 1 were laminated together as Example 2. The optical film of Comparative Example 1 was a single optical film without any patterns. In Example 1, incident light was incident so as to be orthogonal to the stripe direction. In Example 2, incident light was incident in a direction of 45° with respect to both stripe directions of the lamination-type optical film.

Example 3

(Production of Orientation Layer Composition B)

A diazo dye SD1 described in Comparative Example 1 of JP2013-250571A was prepared, and a coating fluid for forming a light orientation layer 1 having the following composition was prepared.

Coating Fluid for Forming Light Orientation Layer (Parts by Mass)

| Diazo dye SD1 | 1.2 |
|---|---|
| Butoxyethanol | 49.9 |
| Dipropylene glycol monomethyl ether | 49.9 |
| Water | 19.0 |

Cholesteric Composition LC-2 (Parts by Mass)

| Polymerizable liquid crystal compound: Compound (A) | 100 |
|---|---|
| Chiral agent used in cholesteric composition LC-1 | 5.6 |
| Polymerization initiator: Irg-907 (manufactured by BASF) | 3.0 |
| Sensitizer: KAYACURE DETX (manufactured by Nippon Kayaku Co., Ltd.) | 1.0 |
| Solvent: Methyl ethyl ketone | 650 |
| Cyclohexanone | 100 |
| Vertical orientation agent 1 | 0.05 |
| Fluorine-based orientation agent 1 | 0.05 |

(Vertical orientation agent 1)

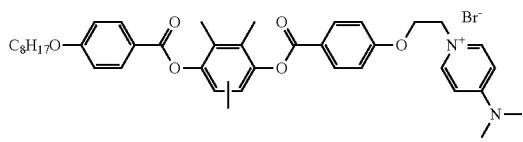

(Flourine-based orientation agent 1)

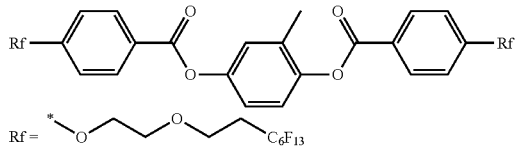

<Formation of Light Orientation Layer 1>

The coating fluid for forming a light orientation layer 1 was applied onto a glass substrate, thereby forming a light orientation layer. Polarized ultraviolet rays were radiated (50 mJ/cm$^2$, 750 W ultrahigh mercury lamp) to the obtained light orientation layer, thereby forming a light orientation layer 1.

<Patterning>

The cholesteric composition LC-2 was applied onto the produced light orientation layer 1 (application step). Next, the cholesteric composition was heated and dried on a hot plate at 160° C. for 60 seconds and then cooled to 100° C. (aging step). Next, the cholesteric composition was irradiated with ultraviolet rays through a stripe-pattern mask having 3 μm mask opening portions (line portions) and 9 μm mask non-opening portions (space portions) in an exposure amount of 500 mJ/cm$^2$ (365 nm-based) using a PLA-501F stepper manufactured by Canon Inc. (ultrahigh-pressure mercury lamp) (mask exposure step).

Here, the stripe pattern was formed in a direction parallel to the polarization direction of the ultraviolet rays used during the production of the light orientation layer.

After that, the entire substrate was exposed under nitrogen in an air-cooling metal halide lamp (manufactured by Eye Graphics Co., Ltd.) in an exposure amount of 1,000 mJ/cm$^2$ while being heated in a 200° C. atmosphere for five minutes, thereby obtaining a cholesteric pattern divided into an anisotropic region having cholesteric reflection with a reflection central wavelength of 630 nm and a stripe width of 3 μm and an isotropic region having a stripe width of 9 μm (heating and exposure step).

In addition, the thickness of the film after the production of the pattern was measured using a reflection spectroscopic film thickness meter FE-3000 (manufactured by Otsuka Electronics Co., Ltd.) and found out to be 0.4 μm.

The same steps as carried out for the above-described patterning were repeated 10 times, and cholesteric liquid crystal layers were laminated together, thereby obtaining a 4 μm optical film.

The reflectivity of Example 3 was evaluated using the same method as in Example 1 and found out to be 50% or more (A).

Explanation of References 10, 10a, 10b: optical film
11: support
12: orientation layer
13: cholesteric liquid crystal layer
21: optically anisotropic region
22: optically isotropic region
23, 23a, 23b: boundary surface
30: lamination-type optical film
50: aerial imaging device
O: light source
P: imaging location

What is claimed is:

1. An optical film comprising:
a cholesteric liquid crystal layer formed in a stripe-shaped pattern in which an optically anisotropic region having optical anisotropy and an optically isotropic region having optical isotropy are alternately disposed,
wherein a helical axis of a cholesteric liquid crystal in the optically anisotropic region is oriented in one axial direction in a plane of the optical film, and the helical axis is oriented in a normal direction of a boundary surface between the optically anisotropic region and the optically isotropic region.

2. The optical film according to claim 1,
wherein at least some of incident light incident on one surface of the optical film is reflected on the boundary surface and emitted from the other surface of the optical film.

3. The optical film according to claim 1,
wherein the cholesteric liquid crystal layer is formed using a liquid crystal material which is cholesterically oriented and then irradiated with an ultraviolet ray at a temperature equal to or higher than a phase transition temperature to an isotropic phase, thereby exhibiting optical isotropy.

4. The optical film according to claim 2,
wherein the cholesteric liquid crystal layer is formed using a liquid crystal material which is cholesterically oriented and then irradiated with an ultraviolet ray at a temperature equal to or higher than a phase transition temperature to an isotropic phase, thereby exhibiting optical isotropy.

5. A lamination-type optical film comprising:
two sheets of the optical film according to claim 1 laminated together,
wherein the two sheets of the optical film are laminated so that the boundary surfaces are orthogonal to each other.

6. A lamination-type optical film comprising:
two sheets of the optical film according to claim 2 laminated together,
wherein the two sheets of the optical film are laminated so that the boundary surfaces are orthogonal to each other.

7. A lamination-type optical film comprising:
two sheets of the optical film according to claim 3 laminated together,
wherein the two sheets of the optical film are laminated so that the boundary surfaces are orthogonal to each other.

8. A lamination-type optical film comprising:
two sheets of the optical film according to claim 4 laminated together,
wherein the two sheets of the optical film are laminated so that the boundary surfaces are orthogonal to each other.

9. An aerial imaging device comprising:
a light source; and
the lamination-type optical film according to claim 5,
wherein the lamination-type optical film is, relative to the light source, located at a location at which the lamination-type optical film is capable of reflecting light from the light source on the boundary surface of the lamination-type optical film and forming an image in the air.

10. An aerial imaging device comprising:
a light source; and
the lamination-type optical film according to claim 6,
wherein the lamination-type optical film is, relative to the light source, located at a location at which the lamination-type optical film is capable of reflecting light from the light source on the boundary surface of the lamination-type optical film and forming an image in the air.

11. An aerial imaging device comprising:
a light source; and
the lamination-type optical film according to claim 7, wherein the lamination-type optical film is, relative to the light source, located at a location at which the lamination-type optical film is capable of reflecting light from the light source on the boundary surface of the lamination-type optical film and forming an image in the air.

12. An aerial imaging device comprising:

a light source; and the lamination-type optical film according to claim 8, wherein the lamination-type optical film is, relative to the light source, located at a location at which the lamination-type optical film is capable of reflecting light from the light source on the boundary surface of the lamination-type optical film and forming an image in the air.

\* \* \* \* \*